United States Patent [19]

Takahashi

[11] 3,839,602

[45] Oct. 1, 1974

[54] SYSTEMS FOR RECORDING AND/OR REPRODUCING FOUR CHANNEL RECORD DISKS HAVING MIXED SUM AND DIFFERENCE SIGNALS RECORDED ON OPPOSITE GROOVE WALLS

[75] Inventor: Nobuaki Takahashi, Yamato, Japan

[73] Assignee: Victor Company of Japan, Ltd., Yokohama City, Kanagawa-ken, Japan

[22] Filed: May 23, 1972

[21] Appl. No.: 256,114

[30] Foreign Application Priority Data

May 24, 1971 Japan.............................. 46-35419

[52] U.S. Cl......... 119/100.4 St, 179/1 GQ, 179/100.1 TD, 179/100.4 M

[51] Int. Cl........................... G11b 3/00, G11b 3/74

[58] Field of Search............ 179/100.4 ST, 100.4 M, 179/100.4 C, 100.1 TD, 1 G, 1 GQ, 15 BT, 16 P, 16 A, 15 BM, 15 BC

[56] References Cited

UNITED STATES PATENTS 3,067,292 12/1962 Minter........................ 179/100.4 ST 3,401,237 9/1968 Takayanagi................ 179/100.4 ST

*Primary Examiner*—Raymond F. Cardillo, Jr.

[57] ABSTRACT

A system records a four channel record by forming sum and difference signals for each two of four channel signals. The difference signals are compressed, but only with respect to a specific frequency or frequencies in the vicinity thereof. The signals thus compressed are modulated in a difference angle-modulation mode, with a specific frequency as selected a modulation transition point. After multiplexing the sum signals and the angle-modulated difference signals are recorded. A system for reproducing four channel records of the above-described type demodulates the reproduced angle modulated difference signals. The demodulated difference signals are expanded with respect to only the specific frequency or frequencies in the vicinity thereof. Thereafter, the four individual channel signals derived from the expanded reproduced sum signals and difference signals are extracted.

14 Claims, 15 Drawing Figures

SYSTEMS FOR RECORDING AND/OR REPRODUCING FOUR CHANNEL RECORD DISKS HAVING MIXED SUM AND DIFFERENCE SIGNALS RECORDED ON OPPOSITE GROOVE WALLS

BACKGROUND OF THE INVENTION

This invention relates to a recording and/or reproducing system and apparatus for a four channel record disk, and more particularly to a system and apparatus for recording and reproducing signals of four channels on and from a record disk, with reduced noise arising from crosstalk between angle-modulated waves.

The applicant had previously proposed a recording and/or reproducing system for a four channel record disk as disclosed in the specification of U.S. Pat. application Ser. No. 92,803, filed Nov. 25, 1970, now U.S. Pat. No. 3,686,471, issued Aug. 22, 1972. By this proposed system, in the recording system, sum and difference signals are formed respectively from signals of every two channels of the signals of four channels. More specifically, from four channel signals respectively designated by the notations CH1, CH2, Ch3, and Ch4, from first through fourth channels, sum signals (Ch1 + CH2) and (Ch3 + Ch4) and difference signals (Ch1 − Ch2) and (Ch3 − Ch4) are formed. Thereafter, the difference signals are frequency modulated, and frequency-modulated wave difference signals F(Ch1 − Ch2) and F(Ch3 − Ch4) are obtained in a band higher than the above mentioned direct-wave sum signals. These signals are mixed with the direct-wave sum signals (Ch1 + Ch2) and (Ch3 + Ch4).

The two multiplexed signals [(Ch1 + Ch2) + F(Ch1 − Ch2)] and [(Ch3 + Ch4) + F(Ch3 − Ch4)] of the direct-wave sum signals and the frequency-modulated wave difference signals are recorded by cutting on the left and right walls of a groove of the 45 — 45 system on a record disk.

In the reproducing system, reproduced multiplexing signals are respectively separated into direct-wave sum signals and frequency-modulated wave difference signals. The latter signals are demodulated, and the original difference signals are again obtained. The sum signal (Ch1 + Ch2), difference signal (Ch1 − Ch2), sum signal (Ch3 + Ch4), and difference signal (Ch3 − Ch4) obtained in this manner are respectively matrixed, and the original signals Ch1, Ch2, Ch3, and Ch4 of the four individual channels are again obtained. These signals are reproduced audibly from four loudspeakers disposed respectively at left front, left rear, right front, and right rear positions relative to a listener.

Then, if there is a crosstalk between the angle-modulated wave difference signals of the above mentioned two multiplexed signals, an interference noise which was not originally present in the angle-modulated difference signals is generated in the demodulated signals of the angle-modulated wave difference signals as described hereinafter. This interference noise becomes more intense with an increasing quantity of the above mentioned crosstalk and with increasing phase deviation angle.

Furthermore, in the 45 — 45 system signals of respectively different channels are recorded on the left and right channels of a single groove of a record disk. In actual practice it is impossible to reduce crosstalk between the left and right channels completely to zero. It is extremely difficult to manufacture a pickup capable of reducing crosstalk between the angle-modulated wave signals to a very small magnitude particularly in the above mentioned high band.

Instead of employing only a single modulation mode (for example, only frequency modulation mode), the above mentioned angle modulation is accomplished by carrying out two modulation modes. For example, one such mode is frequency modulation with respect to frequencies lower than a specific frequency and another mode is phase modulation with respect to frequencies higher than the specific frequency. There is the above mentioned crosstalk. High-frequency components, of higher harmonics of the modulating wave, are generated particularly in a frequency region in the vicinity of the above mentioned specific frequency, whereby noise is produced.

SUMMARY OF THE INVENTION

Accordingly, a general object of the present invention is to provide a new and advanced system and apparatus for accomplishing recording and reproducing on and from a four channel record disk. Here, an object is to reduce substantially the noise arising from crosstalk between the above mentioned angle-modulated waves.

Another object of the invention is to provide a recording and reproducing system for a four channel record disk. In this connection, an object is to compress and expand only the signal portion in the vicinity of the frequency at the transition point in the angle modulation mode of the modulating signal.

Still another object of the invention is to provide a recording and reproducing system capable of reducing interference noise from a high-frequency component of a modulating wave in the frequency region in the vicinity of the frequency at the transition point of the modulation mode. Here, an object is to reduce crosstalk between angle modulated waves ot two channel signals, respectively recorded on the left and right walls of a single sound groove in a record disk.

Further objects and features of the invention will be apparent from the following detailed description when read in conjunction with the accompanying drawings.

BRIEF DESCRIPTION OF THE DRAWINGS

In the drawings:

(FIG. 3 is similar to FIG. 8 of U.S. Pat. No. 3,686,471);

DETAILED DESCRIPTION

For the purpose of reducing as much as possible the production of interference noise due to the above mentioned crosstalk, it is easily conceivable to reduce within allowable limits the phase deviation angle of the angle-modulated wave. Phase modulation can be considered over the total frequency range of the modulating wave. However, when phase modulation is carried in this manner, the signal-to-noise ratio in the low frequency range becomes small, and recording with good tone quality cannot be obtained.

Figure 1:
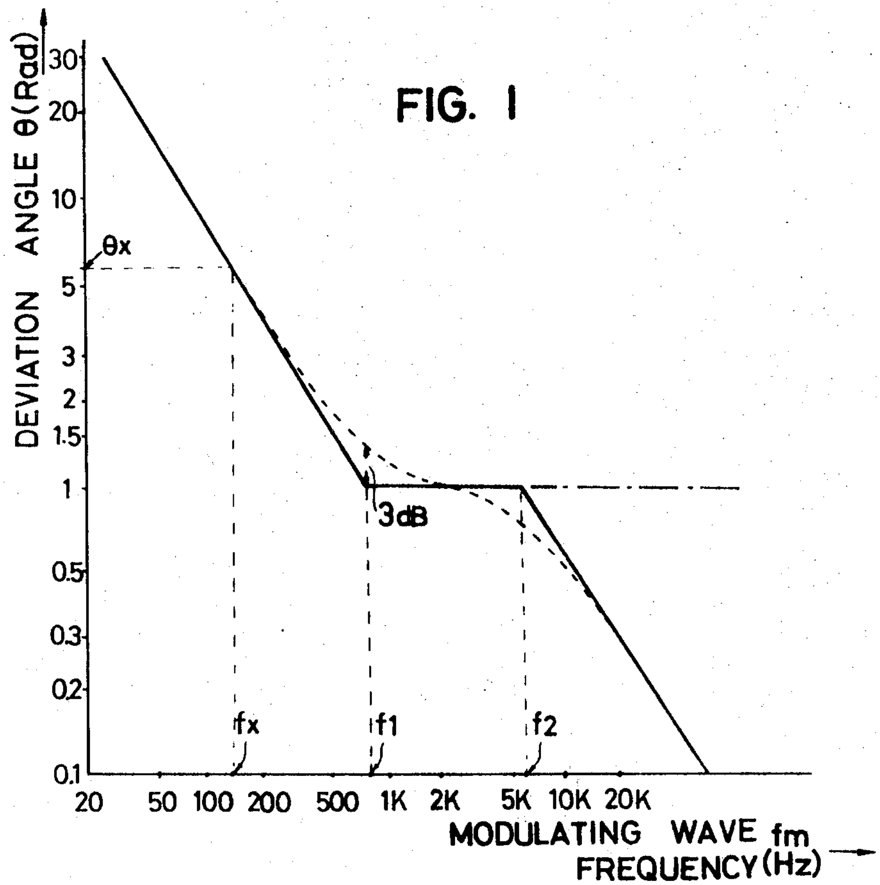
FIG. 1 is a graphical representation indicating the relationship between deviation angle and a modulating wave difference signal.

Accordingly, for preventing a reduction of the signal-to-noise ratio, it is desirable to carry out angle modulation as indicated in FIG 1. According to the proposal of the above mentioned recording and reproducing system of the four channel record disk, angle modulation of the following character is carried out. In the frequency range lower than frequency f1 (800 Hz in the instant embodiment), frequency modulation (FM) is carried out. The phase deviation angle $\theta$ decreases at a rate of −6 dB/oct with respect to, the increase in the frequency, as indicated by the full line in FIG. 1. Furthermore, in the frequency range between frequencies f1 (800 Hz) and f2 (6 KHz in the instant embodiment), phase modulation (PM) is carried out. The phase deviation angle $\theta$(one radian in this embodiment) is constant over the entire range, irrespective of frequency variations. In the frequency range higher than f2, frequency modulation is carried out. The phase deviation angle $\theta$ decreases at a rate of −6 dB/oct with respect to the increase in frequency, as indicated by full line. In the frequency range higher than f2, phase modulation may be carried out, and the phase deviation angle may be made constant (one radian) irrespective of frequency variations as indicated by the single-dot chain line.

In the case where the frequency of the modulating wave is below the frequency f1, since frequency modulation is carried out, the modulation index mf can be represented by the following equation.

$$mf = \Delta F/fm$$

where $\Delta F$ is the maximum frequency deviation, and $fm$ is the modulating frequency.

From the above equation, as the modulation frequency $fm$ becomes smaller than the frequency f1, the modulation index $mf$ increases ($mf$ may be considered to be $\theta$). When the frequency $fm$ of the modulating wave is lower than the frequency f1, that is, in the frequency range lower than the transition frequency point (f1) at which the mode of modulation changes from FM to PM, the phase deviation angle increases with decreasing frequency. For this reason, crosstalk is unavoidable between the signals of angle-modulated waves. The presence of this crosstalk produces an interference signal in the signals demodulated from the angle-modulated waves.

The manner in which this interference signal is produced will be considered in greater detail.

Figure 2A:
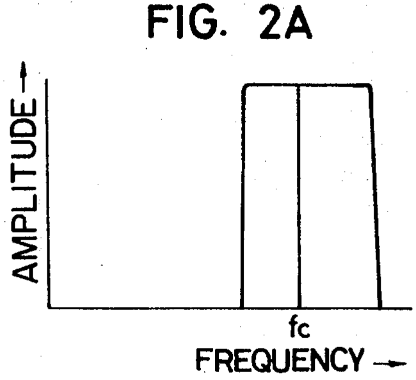
FIGS. 2A and 2B are respectively graphical representations indicating a frequency response for a description of crosstalk between L and R channels.
Figure 2B:
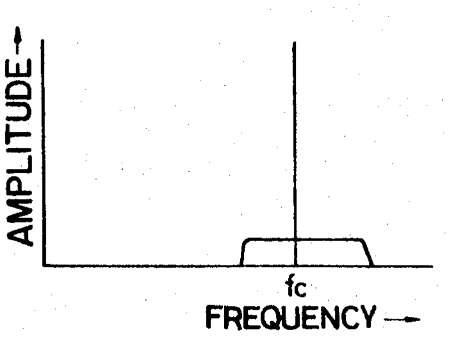

For the purpose of facilitating description and understanding of the invention, it will be assumed that in one of the recorded channels (e.g., the left channel, channel L) includes a frequency-modulated signal wherein the carrier wave $fc$ is frequency modulated by a modulating wave, a frequency $fx$ exists as an angle-modulated wave to be multiplexed on a direct-wave signal. In the other (or right) channel R, only the unmodulated carrier wave $fc$ exists as a signal to be multiplexed on a directwave signal. The frequency bands of the angle-modulated wave signal of the channel L and the carrier wave $fc$ of the channel R, reproduced by a pickup stylus, are respectively indicated in FIGS. 2A and 2B. As indicated in FIG. 2B, crosstalk between the channels L and R causes, in the channel R, admixing of side band components of the frequency modulated signal of the channel L in addition to the carrier wave $fc$.

Figure 3:
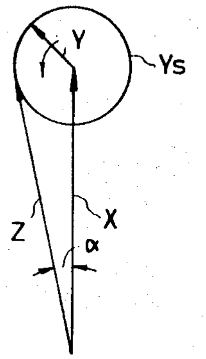
FIG. 3 is a vector diagram for a description of a crosstalk component

The generation of interference noise within the demodulation signal of the channel R, due to crosstalk from the channel L with respect to the above mentioned channel R, can be explained as follows with reference to FIG. 3. In the vector diagram of FIG. 3, vector X represents the carrier wave of the channel R, vector Y the crosstalk component from the channel L to the channel R, and vector Z the resultant of the vectors X and Y. As is apparent from FIG. 3, when a crosstalk component Y from the channel L becomes admixed with respect to the channel R, the vector Z which has been produced by the crosstalk component moves along a circle $Ys$, as the crosstalk component vector Y rotates. The deviation angle $\alpha$ between the vectors X and Y varies as the vector Y rotates. When the signal of the component indicated by the vector Z is demodulated by the demodulator of the channel R, it causes the generation of an interference signal comprising high-frequency components of higher harmonics of the modulating wave of the channel L within the demodulation signal of the channel R, due to the existence of the above mentioned deviation angle $\alpha$.

Figure 4:
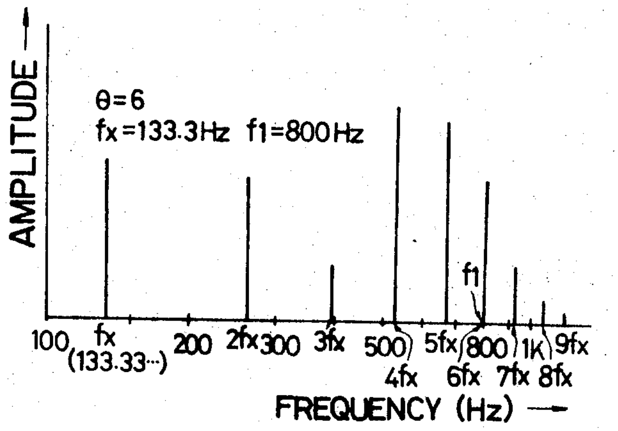
FIG. 4 is a frequency spectrum diagram of a high-frequency component.

One example of the distribution state of these high-frequency component is illustrated in FIG. 4. In this example, the aforementioned frequency f1 is 800 Hz, and the frequency $fx$ of the modulating wave of the channel L is 400/3 (= 133.33 . . . ) Hz. Furthermore, the level of the modulating wave is the standard reference level. The frequency spectrum indicated in FIG. 4 is determined from the curve in FIG. 1. In the curve shown in FIG. 1, the phase deviation angle $\theta$ in the frequency f1 (800 Hz) is one radian, and the maximum frequency deviation $\Delta F$ in the range wherein the frequency $fm$ of the modulating wave is below f1 is equal to f1 (800 Hz). Accordingly, the modulation index $mf$ in the range wherein the frequency $fm$ of the modulating wave is below f1 can be determined from the relationship $\Delta F/fm = mf$. In the above example, since $\Delta F = 800$ Hz, $fx = 400/3$ Hz, $mf = 800/400/3 = 6$. Then, from a table of Bessel functions of the first kind, the values of J1 (*mf*), J2 (*mf*), J3(*mf*), . . . corresponding to the case where the modulation index *mf* is 6 are determined. The magnitudes of the side bands produced when the carrier wave is frequency modulated by the modulating wave (400/3 Hz) are graphically represented, to obtain a result as indicated in FIG. 4. It should be noted that, with respect to the phase deviation angle $\theta x$ corresponding to the frequency *fx* in FIG. 1, also, *mf* may be considered to be equal to $\theta x$, whereby $\theta x = 6$ radians.

It is apparent from FIG. 4 that, of the side bands generated when the carrier wave is frequency modulated by the modulating wave of the reference level, those having a large quantity of energy have high frequencies up to the order of *mf* (also of the order of $\theta x$), that is, of the sixth order in the instant embodiment. Then, in the frequency modulation, the maximum frequency deviation $\Delta F$ is constant, even when the frequency of the modulating wave varies, if the modulating wave is one of a constant level. Accordingly, if the modulating wave in the frequency range below the frequency f1 in FIG. 1 is of the reference level, those of the side bands of the frequency-modulated wave having a large energy all appear in the vicinity of the frequency f1, which is the transition point of the modulation modes. In the example illustrated in FIG. 4, $fx \times mf$ becomes $$400/3 \times 6 = 800 \text{ Hz},$$

and, of the side bands, those having large energy and exhibiting the highest frequencies are at the position of frequency f1 = 800 Hz at the transition point of the above mentioned modulation modes. The frequency of the modulating wave will be denoted by *fm*, and the deviation angle of the phase produced during frequency modulation of the carrier wave by the modulating wave of the frequency fm of the reference level will be denoted by $\theta$. Then, in general, in the frequency range below the frequency f1, in the case where the carrier wave is frequency modulated by a modulating wave of the reference level, and when $fm < f1$, a frequency of $f1 = fm \times \theta$ is the upper limit of those of the side bands produced by the frequency modulation which have large energy.

Figure 5:
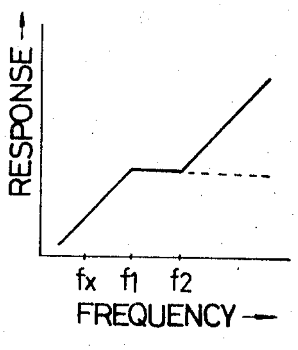
FIG. 5 is a graphical representation indicating the frequency response of an equalizer of a reproduction system.
Figure 6:
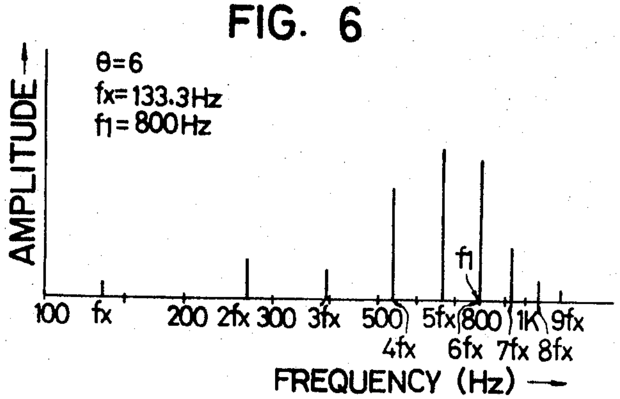
FIG. 6 is a frequency spectrum diagram of a high-frequency component.

The above described side band energy distribution indicated in FIG. 4 also occurs in the channel R. Accordingly, when a demodulation signal in the channel R is led out through an equalizer having a characteristic as indicated in FIG. 5, which is the reverse of the characteristic indicated in FIG. 1, high-frequency components of higher harmonics of a modulating wave of a frequency fx in the channel L appear in the vicinity of the frequency f1, as indicated in FIG. 6, and become an interference noise.

The foregoing description relates to crosstalk in the case where it is assumed that there is an angle-modulated wave signal in the channel L, and there is a carrier wave signal in the channel R. It will be readily understood that, in the case where there are angle-modulated waves in both channels L and R, interference noise is generated because of crosstalk between the two channels.

The above mentioned interference noise due to crosstalk is prevented by the invention from being generated, as described below.

Figure 7:
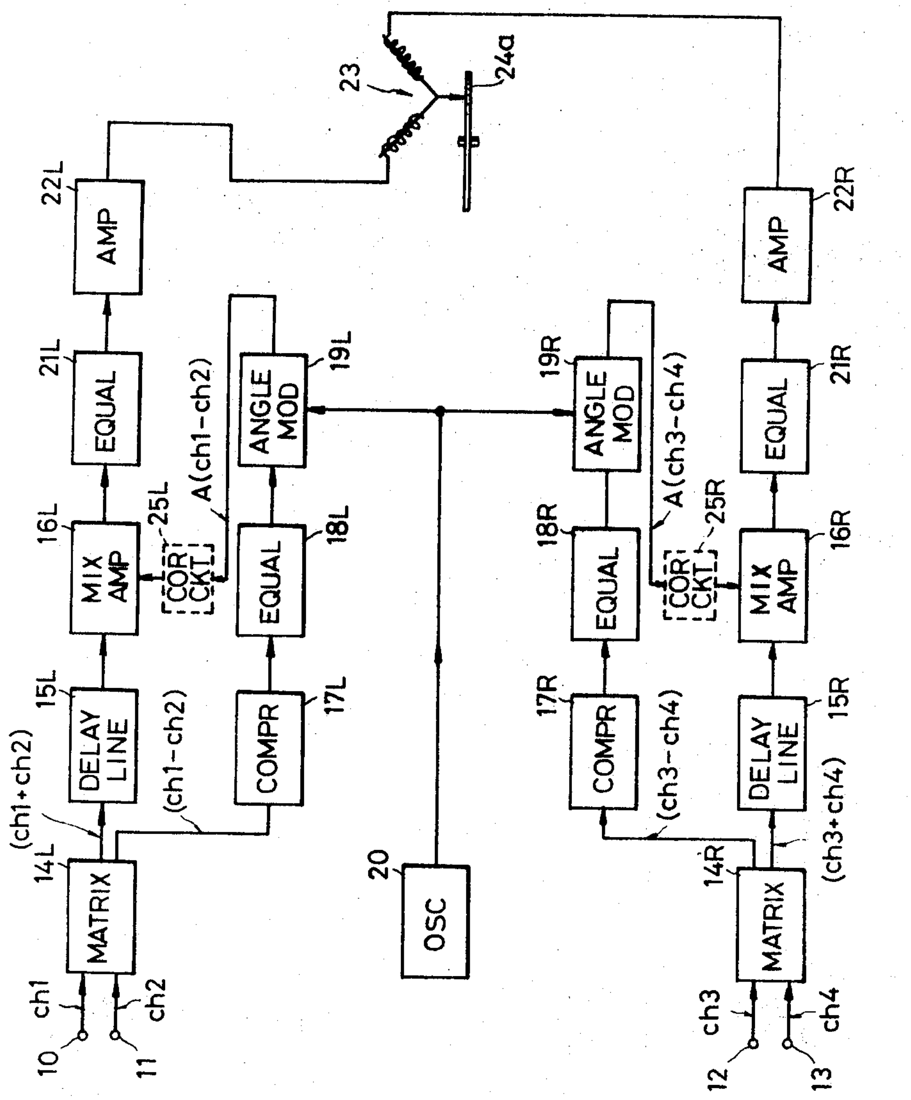
FIG. 7 is a block diagram indicating one embodiment of a recording system for a four channel record disk according to the invention.

One embodiment of a recording system of a four channel record disk according to the present invention is illustrated with the block diagram of FIG. 7.

First and second channel signals Ch1 and Ch2 from four individual signal sources are supplied to a matrix circuit 14L of the left channel L respectively through input terminals 10 and 11. Third and fourth channel signals Ch3 and Ch4 from the above mentioned signal sources are supplied to a matrix circuit 14R of the right channel R respectively through input terminals 12 and 13. A sum signal (Ch1 + Ch2) and a difference signal (Ch1 − Ch2) are formed by the matrix circuit 14L and are respectively supplied to a dealy line 15L and a compressor 17L. Similarly, a sum signal (Ch3 + Ch4) and a difference signal (Ch3 − Ch4) are formed by the matrix circuit 14R and are respectively supplied to a delay line 15R and a compressor 17R. The sum signals (Ch1 + Ch2) and (Ch3 + Ch4) are respectively delayed by specific intervals in the delay lines 15L and 15R for the purpose of time matching with angle-modulated difference signals described hereinafter. They are then respectively supplied to mixing amplifiers 16L and 16R.

The above mentioned difference signals (Ch1 − Ch2) and (Ch3 − Ch4) respectively pass through compressors 17L and 17R described hereinafter. They are then supplied to equalizers 18L and 18R having characteristics as indicated in FIG. 1. To provide a carrier wave the same frequency and the same phase, both modulators 19 are respectively supplied from a single carrier wave oscillator 20. The carrier wave is frequency modulated and phase modulated responsive to a modulating difference signal from equalizers 18L and 18R. The outputs of the angle modulators 19L and 19R, that is, angle modulated wave difference signals A(Ch1 − Ch2) and A(Ch3 − Ch4), respectively pass through correction circuits 25L and 25R. Then they are supplied to the mixing amplifiers 16L and 16R, where they are mixed and multiplexed with the above mentioned sum signals. The correction circuits 25L and 25R should have flat frequency characteristics and have the characteristic of slope of −6 dB/oct, being provided according to necessity.

The outputs of the mixing amplifiers 16L and 16R, that is, multiplex signals [(Ch1 + Ch2) + A(Ch1 − Ch2)] and [(Ch3 + Ch4) + A(Ch3 − Ch4)], respectively passing through equalizers 21L and 21R have the RIAA characteristic. They are supplied to cutter driving amplifiers 22L and 22R, where they are amplified. The output signals of the amplifiers 22L and 22R are supplied to the driving coils of the channel L and channel R of a cutter 23. They are recorded by cutting respectively on the left and right walls of a single groove of a 45 — 45 system in a lacquer disk **24*a*.**

Figure 8:
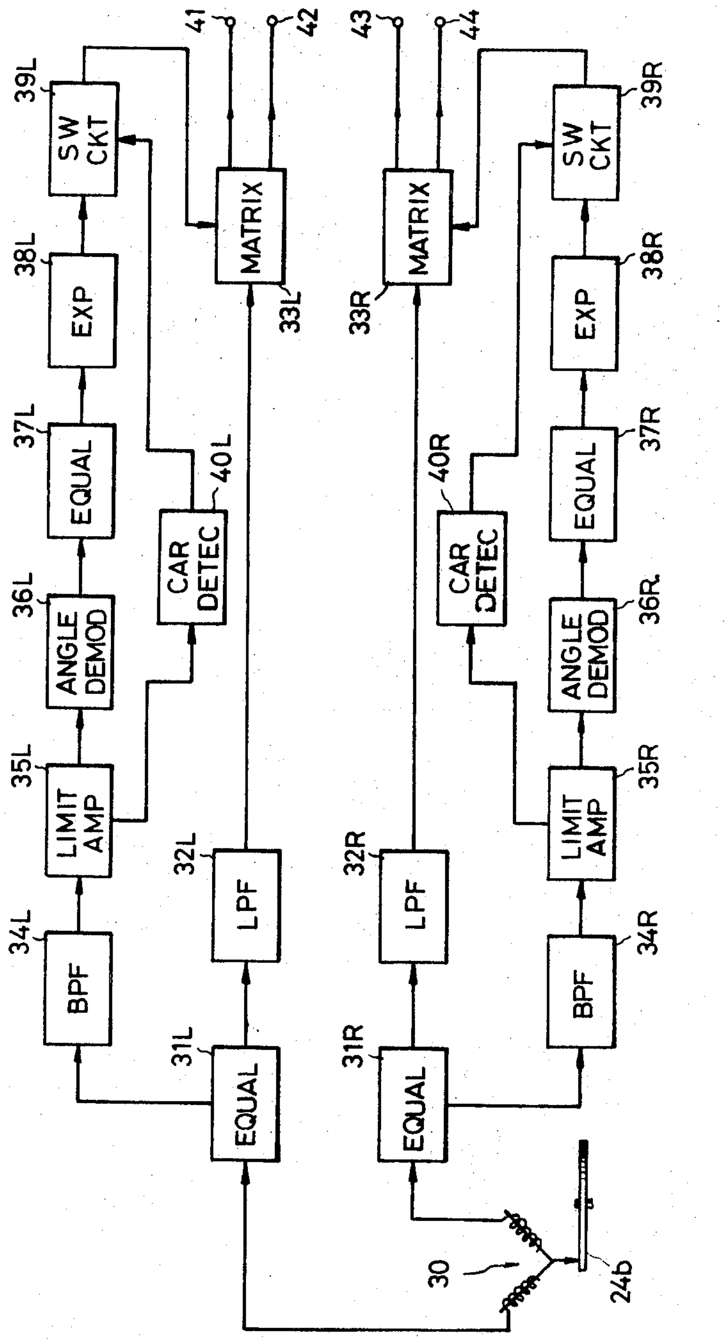
FIG. 8 is a block diagram indicating one embodiment of a reproduction system for a four channel record disk according to the invention.

Next, a reproducing system of the invention will be described, with reference to the block diagram of FIG. 8.

A record disk **24*b* produced by a known process from the lacquer disk 24*a* recorded in the above described manner has the same recorded signal as the lacquer disk 24*a*. Multiplexed signals [(Ch1 + Ch2) + A(Ch1 − Ch2)] and [(Ch3 + Ch4) + A(Ch3 − Ch4)] are respectively passed through equalizers 31L and 31R having the RIAA characteristic and are then supplied to a low-pass filter 32L and a band-pass filter (or high-pass filter) 34L and to a low-pass filter 32R and a band-pass filter (or high-pass filter) 34R.**

Direct-wave sum signals (Ch1 + Ch2) and (Ch3 + Ch4) are filtered by and obtained from the low-pass filters 32L and 32R and thereafter are respectively supplied to matrix circuits 33L and 33R.

On the other hand, angle-modulated difference signals A(Ch1 − Ch2) and A(Ch3 − Ch4) obtained from the band-pass filters 34L and 34R are respectively supplied to amplitude-limiting amplifiers 35L and 35R to be amplified and waveshaped. They are thereafter supplied to angle demodulators 36L and 36R. Difference signals (Ch1 − Ch2) and (Ch3 − Ch4) resulting from the demodulation by the angle demodulators 36L and 36R pass through equalizers 37L and 37R and are then supplied to expandors 38L and 38R, described hereinafter.

Figure 9A:
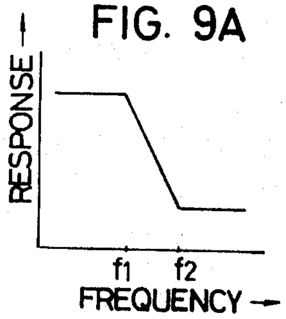
FIGS. 9A and 9B are diagrams respectively indicating equalizer characteristics.
Figure 9B:
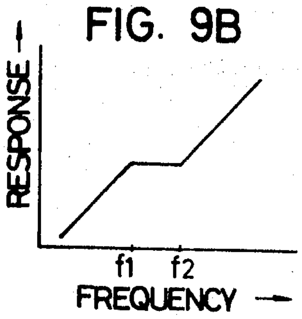

The equalizers 37L and 37R have the characteristic indicated in FIG. 9A in the case where the demodulators 36L and 36R are FM detectors. In the case where these demodulators are PM detectors, they have the characteristic indicated in FIG. 9B. In the case where the demodulators 36L and 36R are FM detectors, it is possible by the combination of the characteristics thereof and the characteristic indicated in FIG. 9A of the equalizers 37L and 37R to obtain the same equalizer characteristic as the equalizer characteristic indicated in FIG. 9B (i.e., the equalizer characteristic are the reverse of the equalizer characteristic indicated in FIG. 1 of the equalizers 18L and 18R used in the recording system).

The output signals of the expandors 38L and 38R are supplied to switching circuits 39L and 39R. On the other hand, portions of the outputs of the amplifiers 35L and 35R are supplied respectively to carrier detection circuits 40L and 40R, which detect the presence or absence of carrier wave components, that is, the presence or absence of angle-modulated wave signal components, is detected. In the case where carrier wave components are absent, that is, where the four channel record disk is not being reproduced, the carrier detection circuits 40L and 40R operate to place the switching circuits 39L and 39R in the OFF state to prevent passage of signals. Only in the case where carrier wave components are present, that is, where the four channel record disk is being reproduced, the carrier detection circuits 40L and 40R operate to place the switching circuits in the ON state. Controlling the switching circuits in this manner, the carrier detection circuits carry out one kind of muting operation. The signals passed by the switching circuits 39L and 39R are supplied to the above mentioned matrix circuits 33L and 33R.

In the matrix circuit 33L, the sum signal (Ch1 +Ch2) from the low-pass filter 32L and the difference signal (Ch1 − Ch2) from the switching circuit 39L are matrixed, and first and second channel signals Ch1, Ch2 are obtained as individual outputs from output terminals 41 and 42. Similarly, the matrix circuit 33R operates to matrix the sum signal (Ch3 + Ch4) from the low-pass filter 32R and the difference signal (Ch3 − Ch4) from the switching circuit 39R, and third and fourth channel signals Ch3, Ch4 are obtained from output terminals 43 and 44. These first, second, third, and fourth channel signals obtained from the output terminals 41 through 44 are audibly reproduced by first through fourth loudspeakers disposed on the left front, left rear, right front, and right rear of a listener.

Next, to be described are the operations of compressors 17L and 17R (represented collectively by reference numeral 17) and expandors 38L and 38R (represented collectively by numeral 38). These circuits constitute essential components of the circuit of the invention in the above described recording and reproducing system.

Figure 10:
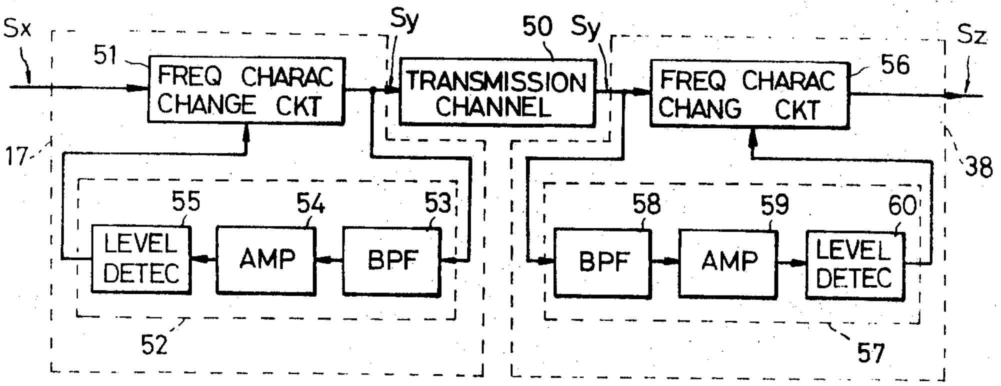
FIG. 10 is a block diagram indicating an essential organization of one embodiment of the recording and reproducing system according to the invention.

The compressor 17 and the expandor 38 are shown in FIG 10. The compressor 17 may be considered to be made up, essentially, of a frequency characteristic changing circuit 51 and a control circuit 52. The control circuit 52 comprises a band-pass filter 53 for passing signals of a specific frequency band from among the output signals of the circuit 51, an amplifier 54 for amplifying the output signals of the band-pass filter 53, and a level detection circuit 55 for envelope detecting the levels of the output signal of the amplifier 54. (see U.S. Pat. No. 3,757,254 description of amplifier 167, col 12, line 31, et seq.) The voltage of the output control signal of the level detection circuit 55 is applied to a control element (e.g., a transistor or FET) provided in the frequency characteristic changing circuit 51. The output of circuit 55 varies the resistance value of the control element. Consequently, the circuit 51 varies the frequency characteristic thereof in correspondence with the signal level.

The output signal of the compressor 17 in the recording system is supplied by way of a transmission channel 50 including parts such as the aforementioned cutter 23 and pickup 30. These common parts generate crosstalk between the channels L and R when the signal is applied to the expandor 38 in the reproducing system.

The expandor 38 has an organization similar to that of the compressor 17 and is made up, essentially, of a frequency characteristic changing circuit 56 and a control circuit 57. The control circuit 57 is similar to the control circuit 52 in that it comprises a band-pass filter 58 for passing signals of a specific frequency band from among the input signals of the expandor 38, an amplifier 59, and a level detection circuit 60 for controlling the frequency characteristic changing circuit 56.

In the instant embodiment, the frequency characteristic changing circuit 51 has a variable attenuation network including a control element. The frequency characteristic changing circuit 56 is organized as a negative-feedback amplifier having a control element in the feedback path thereof.

For the following analytic description of this example, the imput signal of the compressor 17 is denoted by $Sx$, the output signal of the compressor 17 (i.e., input signal of the expandor 38) by $Sy$, the output signal of the expandor 38 by $Sz$, the compression ratio in the compressor 17 by K, the amplification degree of the amplifier in the frequency characteristic changing circuit 56 of the expandor 38 by A1, and the negative feedback ratio thereof by $\beta$. If the compression ratio K and the negative feedback ratio $\beta$ are selected so that $K = \beta$, the relationship between the input and output signals $Sx$ and $Sy$ of the compressor 17 can be represented as follows.

$$Sy = KSx \quad (1).$$

Furthermore, the relationship between the input and ourput signals $Sy$ and $Sz$ of the expandor 38 can be expressed by the following equation.

$$Sz = A1 \cdot Sy/1 + A1 \cdot \beta \quad (2).$$

In the case where $A1>>1$, the above Equation (2) becomes $$Sz = Sy/\beta \quad (3).$$

Under the condition $K = \beta$, the relationship between the output signal $Sz$ and the input signal $Sx$ becomes as follows from the above Equations (1) and (2).

$$Sz = K \cdot Sx/\beta = Sx \quad (4).$$

Therefore, the signal input and output characteristics of the entire organization indicated in FIG. 10 are linear and do not give rise to any distortion whatsoever with respect to signals in the system. It is possible to reduce effectively the noise generated in the transmission channel 50.

Figure 11:
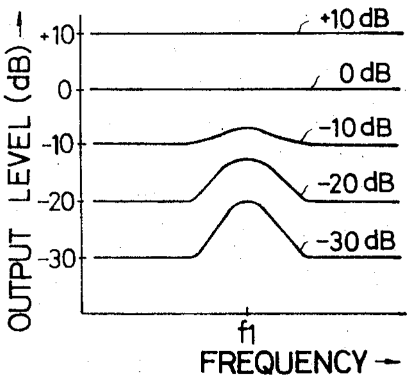
FIG. 11 is a graphical representation indicating the frequency characteristic of the output level of a compressor.

FIG. 11 shows the frequency characteristics of output signal levels of the above described compressor 17, wherein the input signal level is taken as a parameter. The compressor 17 does not carry out frequency characteristic change in the case where the level of the input difference signal is high (that is, as exemplified for 0dB and +10 dB). In the case where the level of the input difference signal is low (that is, as exemplified for −10 dB, and −30 dB), the compressor 17 intensifies the levels of the signal components in the vicinity (e.g., 200 Hz - 2KHz) of the frequency f1 (800 Hz in the instant embodiment) at the transition point of the aforedescribed modulation modes (FM and PM). In this case, the degree of level intensification increases with decreasing input signal level.

Figure 12:
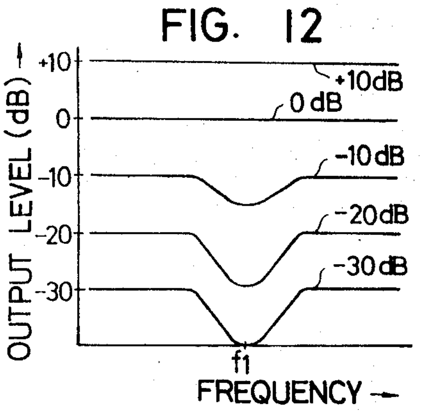
FIG. 12 is a graphical representation indicating the frequency characteristic of the output level of an expandor.

The frequency characteristics of the output signal levels of the expandor 38, wherein the input signal is taken as a parameter, are indicated in FIG. 12. From FIG. 12, it is apparent that the expandor 38 has characteristics which are complementary to those of the compressor 17. More specifically, the expandor 38 does not change the frequency characteristic where the input signal level is high (as exemplified for 0 dB and +10 dB). When the input signal level is low (as exemplified for −10 dB, −20 dB, and −30 dB), the expandor 38 operates to attenuate the levels of the signal components in the vicinity (200 Hz to 2 KHz) of the frequency f1 (800 Hz) at the transition point of the modulation modes. In this case, the degree of level attenuation increases a decreasing input signal level.

Figure 13:
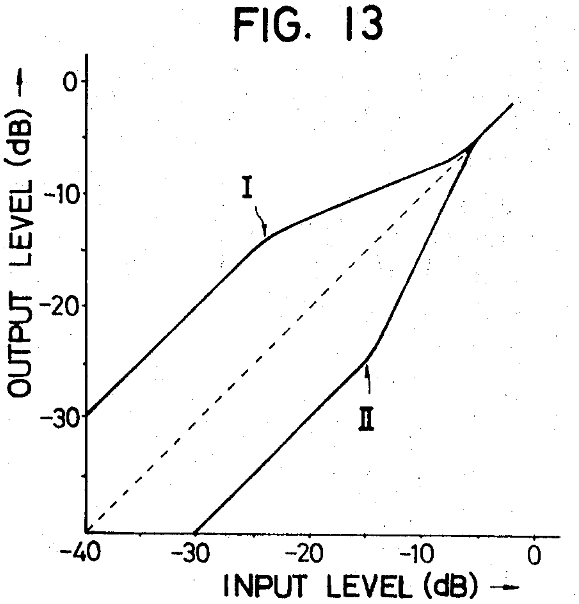
FIG. 13 is a graphical representation indicating the compression characteristic and expansion characteristic of a compressor and an expandor.

The input and output characteristic of the compressor 17, as indicated in FIG. 13. The input and output characteristic, that is, the compression characteristic I and the expansion characteristic II are shown for the frequency f1 at the transition point of the modulation mode.

The reduction of the noise due to crosstalk by the above described circuit will now be described with respect to one example. It will be assumed here that an angle-modulated wave signal is present in the channel L, while only a carrier wave is present in the channel R. It will be assumed further that the magnitude of crosstalk between the channels L and R in the pickup 30 is 14 dB at the frequency f1 of the transition point.

In this case, the ratio (FIG. 3) of the length of the vector X with respect to the standard reference level to the length of the vector Y becomes 1 : 0.2. The maximum phase deviation angle $\alpha$ of the vector Z from the vector X, becomes approximately 0.2 radian. Then, in FIG. 1, the actual curve of the reference phase deviation angle is as indicated by a dotted line which joins characteristic curves (lines) indicated by full lines (which constitute the asymptotes thereof). Accordingly, as is apparent from the actual curve indicated by dotted line, the phase deviation angle at the transition point frequency f1 is positioned +3 dB upward from the curves indicated by full line. Consequently, the deviation angle at the frequency f1 is 3 dB (approximately 1.4 radians) relative to 1 radian. Therefore, the crosstalk ratio between the channels L and R becomes 14 dB + 3 dB = 17 dB. Due to fact that the maximum phase deviation angle $\alpha$ is 0.2 radian, the interference noise becomes −17 dB relative to the reference level.

This interference noise input is subjected to an attenuation of −10 dB by the expandor 38, as is apparent from curve II of the expansion characteristic of the expandor 38 indicated in FIG. 13. Accordingly, the interference noise in the vicinity of the transition point frequency f1 in the demodulation output signal becomes −27 dB relative to the reference level. Therefore, even if a pickup of a crosstalk quantity of 14 dB is used, the result attained will be the same, in effect, as that which would be attained by the use of a pickup of a crosstalk quantity of −27 dB.

For the purpose of removing also noises characteristically related to record disks (for example, scratch noises), the frequency range for the operation of the compressor 17 and the expandor 38 need not be limited to only the aforementioned transition point frequency f1 (800 Hz) and to the frequency region (200 Hz to 2 KHz) in the vicinity thereof, but may be expanded up to a high frequency range, e.g., of 2 KHz or higher.

Further, this invention is not limited to these embodiments but various variations and modifications may be made without departing from the scope and spirit of the invention.

What I claim is:

1. A recording system for a four channel record disk comprising: signal source means for supplying separate first, second, third, and fourth channel signals; matrix circuit means for forming a first sum signal and a first difference signal from said first and second channel signals and a second sum signal and a second difference signal from said third and fourth channel signals; compressor means for compressing said first and second difference signals only in the vicinity of a specific frequency, the output level of said compressor means being intensified as the input signal level thereto is decreased; angle-modulation means responsive to signals which have passed through said compressor means for frequency modulating said first and second difference signals up to said specific frequency and for phase modulating at least one part of the frequencies above said specific frequency so that said specific frequency becomes the transition point of the modulation modes where frequency modulation changes to phase modulation thereby to produce first and second angle-modulated difference signals; mixing means for mixing said first and second sum signals respectively with said first and second angle-modulated difference signals; and recording means responsive to the resulting outputs of said mixing means respectively for recording by cutting on the left and right walls of a groove on the record disk.

2. A recording system as set forth in claim 1 in which said angle-modulating means phase modulates said first and second difference signals in the frequency range above said specific frequency.

3. A recording system as set forth in claim 1 and means whereby said angle-modulating means phase modulates signal components of the frequencies of said first and second difference signals in a band between a first specific frequency and a second specific frequency which is higher than said first specific frequency, and means whereby said angle-modulating means frequency modulates signal components of the frequencies in the range above said second specific frequency.

4. A recording system as set forth in claim 1 in which said compressor means comprises: frequency characteristic changing circuit means operating in response to an applied control signal voltage to intensify the levels of signals at and in the vicinity of said specific frequency; band-pass filter means for obtaining said signals at and in the vicinity of said specific frequency responsive to the output signals of said frequency characteristic changing circuit means; and control circuit means operating in response to the level of an output signal of said band-pass filter means to form a control signal voltage for controlling said frequency characteristic changing circuit means.

5. A recording system as set forth in claim 1 in which said specific frequency is of the order of 800 Hz.

6. A system for reproducing wherein said four channel record disk has respectively recorded thereon a first mixed signal comprising a first sum signal and a first angle-modulated difference signal and a second mixed signal comprising a second sum signal and a second angle-modulated difference signal, said reproducing system comprising: means for reproducing all of the recorded signals as electric signals, means for separating the first and second sum electrical signals and the first and second angle-modulated electrical signals; angle-demodulation means for demodulating said first and second angle-modulated electrical difference signals thus separated thereby producing first and second difference signals; expandor means for expanding frequency components of said demodulated first and second difference signals only in the vicinity of said specific frequency, means for attentuating the output level of said expandor means as a function of decreases in the input level thereof; and matrix means responsive to the first and second sum electrical signals separated by said separating means and said first and second difference signals which have passed through said expandor means, for separating the individual first, second, third, and fourth channel signals.

7. A reproducing system as set forth in claim 6 in which said expandor means comprises: frequency characteristic changing circuit means operating in response to an applied control signal voltage to attenuate the levels of the frequency components of said demodulated first and second difference signals having frequencies in the vicinity of said specific frequency; band-pass filter means responsive to the demodulated first and second difference signals for passing frequency components thereof in the vicinity of said specific frequency; and control circuit means operating in response to the level of the output signal of said band-pass filter means to form a control signal voltage for controlling said frequency characteristic changing circuit means.

8. A reproducing system as set forth in claim 6 in which said specific frequency is of the order of 800 Hz.

9. A system for reproducing a four channel record disk having recorded thereon a first mixed signal comprising a first sum signal and a first angle-modulated difference signal and a second mixed signal comprising a second sum signal and a second angle-modulated difference signal, said reproducing signal comprising: means for converting the recorded signals into electrical signals, means for separating the first and second sum signals and the first and second angle-modulated signals in response to the electrical signals from said converting means; angle-demodulation means for demodulating said first and second angle-modulated difference signals thus separated thereby to produce the first and second difference signals; expandor means for expanding said demodulated first and second difference signals in the vicinity of the specific frequency at a transition point between modulation modes used during recording, means for attenuating the output level of said expandor means as the input level thereof is decreased; and matrix means responsive to the output signals of said expandor means and said separated first and second sum signals for separating individual first, second, third, and fourth channel signals.

10. A recording system for a four channel record disk comprising signal source means for supplying separate first, second, third and fourth channel signals; matrix circuit means operated responsive to said channel signals for composing a first sum signal and a first difference signal from the first and second channel signals and also for composing a second sum signal and a second difference signal from the third and fourth channel signals; compressor means for compressing the first difference signal and the second difference signal respectively with particular compression emphasis on first frequency components which are distributed at and in the vicinity of a predetermined frequency and with less than said particular compression emphasis in second frequency components in a range which is lower than the first frequency components, said particular compression emphasis being further increased as the level of said first frequency components decreases in said range; angle-modulation means for phase modulating a carrier signal responsive to third frequency components of the compressed first difference signal and the compressed second difference signal respectively which frequency components are within a frequency band, the lowest frequency of which is said predetermined frequency, and said angle-modulation means frequency modulating the carrier signal responsive to frequency components of the compressed first difference signal and the compressed second difference signal respectively, which are frequency components outside of said frequency band, thereby producing a first angle-modulated difference signal and a second angle-modulated difference signal respectively; mixing means for mixing and multiplexing the first sum signal with the first angle-modulated difference signal and also the second sum signal with the second angle-modulated difference signal respectively; and recording means for simultaneously recording one of the multiplexed signals on the left wall of a groove of a record disk and the other multiplexed signal on the right wall of the groove.

11. The recording system as defined in claim 10 wherein each of said compressor means comprises frequency characteristic changing circuit means operated responsive to a control signal for further intensifying said first frequency components as compared to the second low frequency components of the corresponding difference signal as the level of said control signal decreases; band-pass filter means for filtering and obtaining said frequency components of the corresponding difference signal from the output signal of said frequency characteristic changing circuit means; and control circuit means for producing the control signal in accordance with the level of the output signal of said band-pass filter means.

12. The recording system as defined in claim 10 wherein said predetermined frequency is approximately equal to 800 Hz.

13. A reproducing system for a four channel record disk having respectively recorded thereon a multiplexed signal of the first sum signal and the first angle-modulated difference signal and the multiplexed signal of a second sum signal and a second angle-modulated difference signal; said reproducing system comprising separating means for separating the first sum signal, the first angle-modulated difference signal, the second sum signal and the second angle-modulated difference signal from the multiplexed signals picked up from the left and right walls of the groove of the record disk; angle-demodulation means for angle-demodulating the angle-modulated difference signals to reproduce the compressed first difference signal and the compressed second difference signal respectively; expandor means for expanding the reproduced compressed first difference signal and the reproduced compressed second difference signal respectively to attenuate the first frequency components distributed at said predetermined frequency with particular expansion emphasis, with less than said particular expansion emphasis in the second frequency components of the reproduced signals, said particular expansion emphasis being further increased as the level of said first frequency components decreases in said range, so as to restore the original first difference signal and the original second difference signal respectively; and matrix means responsive to the separated first sum signal and the restored first difference signal, and also responsive to the separated second sum signal and the restored second difference signal respectively for individually reproducing the original first, second, third and fourth channel signals.

14. The reproducing system as defined in claim 13 wherein each of said expandor means comprises frequency characteristic changing circuit means operating responsive to a control signal for further attenuating said first frequency components as compared to the second low frequency components of the corresponding reproduced compressed difference signal as the level of said control signal decreases; band-pass filter means for filtering and obtaining said first frequency components from the corresponding reproduced compressed difference signal which frequency components are distributed at and in the vicinity of said predetermined frequency; and control circuit means for producing said control signal in accordance with the level of the output signal of said band-pass filter means.

* * * * *